United States Patent

Rosebach, Jr.

[15] 3,639,036
[45] Feb. 1, 1972

[54] LIGHT-REFLECTIVE WHEEL COVERS

[72] Inventor: Edward J. Rosebach, Jr., 48 Mill St., Abington, Mass. 02351

[22] Filed: Apr. 13, 1970

[21] Appl. No.: 27,830

[52] U.S. Cl..................................................350/97, 301/37
[51] Int. Cl. .........................................................G02b 5/12
[58] Field of Search......................350/97, 99, 100, 288, 299; 301/37

[56] References Cited

UNITED STATES PATENTS

| | | | |
|---|---|---|---|
| 2,665,947 | 1/1954 | Lyon | 350/99 |
| 2,781,017 | 2/1957 | Fuller et al. | 350/97 |
| 2,220,953 | 11/1940 | Carver | 350/100 |
| 1,745,163 | 1/1930 | Graham | 350/97 |

Primary Examiner—David Schonberg
Assistant Examiner—Michael J. Tokar
Attorney—Wolf, Greenfield & Sacks

[57] ABSTRACT

A conventional vehicle hubcap is provided on its inside surface with a light reflective means so that when the hubcap is detached from its normal operative position on a vehicle it can act as a light-reflecting safety device. A preferred hubcap support means for supporting the hub cap when used as a safety device comprises a compact plastic stand.

6 Claims, 3 Drawing Figures

PATENTED FEB 1 1972

3,639,036

LIGHT-REFLECTIVE WHEEL COVERS

BACKGROUND OF THE INVENTION

In recent years, vehicle safety devices of various types have been proposed and in some cases adopted. In many cases, safety devices proposed have not come into general usage because of high cost of implementation and/or impairment of normal vehicle functions by the use of such proposed safety devices.

In the vehicle wheel cover or hubcap field, the prior art has consistently considered the hubcap as functional only when applied to the wheel of a vehicle. Suggestions have been made for the use of light reflective means on the outside of such hubcaps but such suggestions and proposals have not met with widespread commercial usage probably due to the limited esthetic appeal. Moreover, light reflective surfaces on the outside of a hubcap are frequently nonfunctional due to the grime which often covers hubcaps in normal usage.

It is an object of this invention to provide an improved vehicle wheel cover which is capable of functioning as a safety device.

Another object of this invention is to provide an improved vehicle wheel cover in accordance with the preceding object which is inexpensive to construct and which does not detract from the normal hubcap functioning of the improved wheel cover.

Still another object of this invention is to provide a support stand for the improved vehicle wheel cover of this invention.

BRIEF STATEMENT OF THE INVENTION

A vehicle hubcap means is provided having a wall means defining an inner surface constructed and arranged to be hidden from view when the hubcap means is mounted in its operative position on a vehicle wheel. A light reflective means overlies the inner surface so that when the hubcap means is detached from its normal operative position it is useful as a safety device. Preferably the light reflective means is a layer of luminescent light reflective paint on the inner surface of the hubcap.

It is a feature of this invention that since the light reflective paint is on the inner surface of the hubcap facing the axle of a vehicle, it is not covered with dust, dirt and grime in normal road usage. Therefore, when the hubcap is removed from a vehicle wheel as when changing a flat tire, the hubcap is available for use as a safety device. A stand is provided so that the user can mount the hubcap with the light-reflective surface facing the highway when changing the tire. Since the hubcap is the first item removed when changing a tire, it is simple to place it in a stand prior to beginning any substantial work in loosening bolts and the like in changing a tire. Similarly, when a new tire is mounted on the car, the hubcap is the last item to complete the tire changing operation and it can then be removed from the stand, and placed on the wheel.

BRIEF DESCRIPTION OF THE DRAWINGS

The above and other features, objects and advantages of the present invention will be better understood from the following drawings in which.

DESCRIPTION OF PREFERRED EMBODIMENTS

Figure 1:
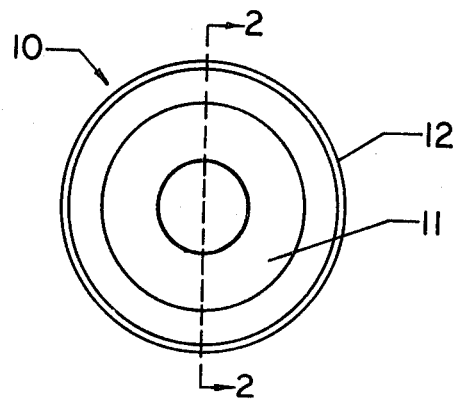
FIG. 1 is a rear view of an improved hubcap in accordance with this invention.

With reference now to the drawings, a hubcap 10 in accordance with this invention is illustrated in FIG. 1. The hubcap can be of any conventional design. As used herein, the term "hubcap" is meant to include wheel covers of the hubcap type as conventionally used in the vehicle industry. For example, various diameter hubcaps are known, some of which cover only the central portion of the axle while others extend outwardly on the rim of the tire closely adjacent to the tire itself. All hubcaps of conventional design are suitable for use in the present invention and are meant to be included herein.

Figure 2:
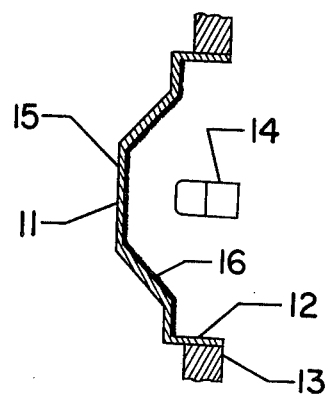
FIG. 2 is a cross-sectional view thereof taken along line 2—2 of FIG. 1 and semidiagrammatically showing parts of a vehicle and wheel to which it is attached.

The hubcap 10 defines a dished portion 11 and an outer circular rim 12. The rim 12, as best shown in FIG. 2 frictionally attaches to the rim 13 of a conventional pneumatic tire to cover the axle or hubcap of the axle 14 diagrammatically illustrated.

The dished portion 11 comprises an inner wall surface 15 which in normal usage of hubcaps would be bare. The improvement of this invention comprises forming a layer 16 of a light reflective paint such as "Krylon", a red-orange luminescent paint. Any of the conventional light reflective paints as used for highway signs and the like can be used on the inner surface of the hubcap 10. In some cases, plastic layers, films or other light reflective devices can be mounted on the inner surface 15. Because the light-reflective paint 16 in on the inner surface of the hubcap, it is not presented to view in normal use of the hubcap when mounted on the vehicle. However, when removed from the vehicle as during changing of a flat tire, the hubcap is available for use mounted near the car to reflect light from oncoming cars at night. Moreover, the light reflective paint is preferably of a conventional luminescent red or orange color so that it is useful as a safety signal even during daylight hours.

Figure 3:
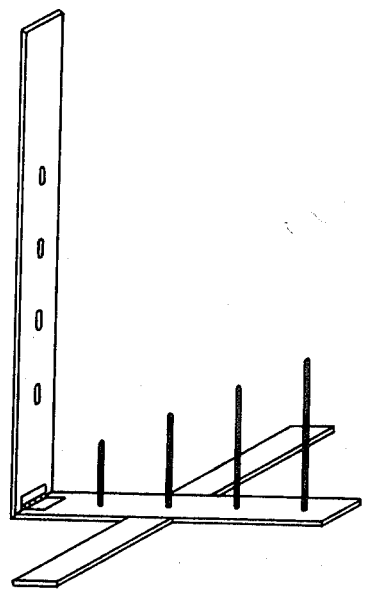
FIG. 3 is a perspective view of a preferred hubcap stand in accordance with this invention.

Turning now to the preferred support stand of this invention as shown in FIG. 3, the hubcap 10 can be mounted in a generally upright position with the light-reflective surface 16 exposed to view. The stand 20 defines a plastic rectangular strip 21 hinged to a base strip 22 and carrying opposed outrigger-hinged arms 23 and 24. The base strip 22 defines upstanding dowel members 25 preferably spaced approximately 1 inch apart along the length of the base strip 22. In the preferred embodiment, all parts are made of plastic although other materials can be used. A hinge 26 limits pivoting of the upright member 21 with respect to the base 22 to a 90° angle as shown. Hinge connections (not shown) between the outrigger arms permit them to be folded upward for storage while the hinge 26 permits the upstanding member to be folded downward to a flat position adjacent the base for storage. For this purpose, the upright member 21 defines slots 27 positioned to allow the prongs 25 to pass therethrough during storage.

FIG. 3 shows one position of the hubcap in the support stand. It should be understood that many support stands can be used as desired in the present invention. In some cases, the hubcap itself can be leaned against the car or any other support without the need for the motorist carrying a separate support stand.

While specific embodiments of the present invention have been shown and described, many modifications thereof are possible.

What is claims is:

1. A vehicle hubcap means comprising,
   wall means defining an outer surface, inner surface constructed and arranged to be facing a vehicle and hidden from view when said hubcap means is mounted in its operative position on said vehicle,
   a luminescent light reflective means overlying said inner surface whereby when said hubcap means is detached from its normal operative position it can act as a safety signal reflector.

2. A vehicle hubcap means in accordance with claim 1 wherein said light reflective means comprises a layer of light reflective luminescent paint substantially covering said inner surface.

3. A vehicle hubcap means in accordance with claim 2 and further comprising support means for supporting said inner surface in an upright position when said hubcap means is removed from said vehicle.

4. A vehicle hubcap means in accordance with claim 3 wherein said support means comprises an upright member hinged to a base member.

5. A vehicle hubcap means in accordance with claim 4 wherein said base member defines two outstanding support arms, said base member carrying upwardly extending dowels.

6. A vehicle hubcap means in accordance with claim 5 wherein said base member carries hinge means for folding said support means.

* * * * *